United States Patent [19]
Fookes et al.

[11] Patent Number: 5,972,266
[45] Date of Patent: Oct. 26, 1999

[54] COMPOSITE PRODUCTS

[75] Inventors: David Fookes, New Westminster; Marek Jan Gnatowski, Coquitlam; Robert Leeson Pike, Vancouver, all of Canada; Derek Alexander Templeton, Alpharetta, Ga.

[73] Assignee: Trus Joist MacMillan a Limited Partnership, Boise, Id.

[21] Appl. No.: 09/030,920

[22] Filed: Feb. 26, 1998

[51] Int. Cl.⁶ .............................. B29C 59/02; B27N 3/06; B05D 3/12; B05D 1/02
[52] U.S. Cl. .......................... 264/122; 264/109; 427/192; 427/427; 427/369; 427/370; 427/440
[58] Field of Search ..................... 427/192, 369, 427/370, 427, 440, 441; 264/122, 109

[56] References Cited

U.S. PATENT DOCUMENTS

| | | | |
|---|---|---|---|
| 4,241,133 | 12/1980 | Lund et al. | 428/326 |
| 4,876,154 | 10/1989 | Witucki et al. | 428/447 |
| 4,879,083 | 11/1989 | Knudson et al. | 264/122 |
| 5,763,338 | 6/1998 | Sean | 442/413 |

*Primary Examiner*—Shrive Beck
*Assistant Examiner*—Michael Barr
*Attorney, Agent, or Firm*—C. A. Rowley

[57] ABSTRACT

The resistant to biological degradation of composite wood products is improved by applying a suitable aqueous dispersion of zinc borate onto the fibers to uniformly distribute and to adhere the zinc borate to the strands of the wood composite, applying a suitable adhesive to the wood strands, forming a strand lay-up and consolidating a lay-up under heat and pressure to form a consolidated product with zinc borate uniformly distributed therethrough.

20 Claims, 1 Drawing Sheet

COMPOSITE PRODUCTS

FIELD OF INVENTION

The present invention relates to consolidated composite wood products, more particularly, the present invention relates to a method of producing a consolidated wood product incorporating a biological degradation protection additive.

BACKGROUND OF THE INVENTION

Composite wood products are generally formed from wood strands or the like bonded together by a suitable resin such as phenol formaldehyde (PF) or isocynate resins (MDI). The strands may be random or parallel oriented relative to one another and in some cases, the composite product is made from layers with different orientation or strands in adjacent layers.

These composite products find a variety of different usages, many of which are enhanced by providing the product with improved biodurability.

It has been shown in U.S. Pat. No. 4,879,083 issued Nov. 7, 1989 to Knudson et al. to apply anhydrous borax or zinc borate to the wood strand and bond the strands together into a composite product resistant to decay by insects and/or organisms using phenol formaldehyde as the binding agent. This teaching overcame a particular problem of the use of borax with phenol formaldehyde wherein the borax impeded the binding characteristics of the phenol formaldehyde.

It is also now known to add zinc borate to wood composites in conventional blending operations in processes using resins such as phenol formaldehyde as taught by Knudson et al. or other resins including isocynate resins for binding the strands for form the composite product resistant to biological degradation. Such addition of zinc borate in powdered form has been found to be difficult implement on a commercial scale as the powdered zinc borate and causes dusting and other problems regardless of the adhesive resin being used. For example, zinc borate sometimes absorbs liquid when MDI resin are used thereby reducing the internal bond of the product. Generally, the poor adhesion of the produced zinc borate causes waste and increase dust problem throughout the mill.

BRIEF DESCRIPTION OF THE PRESENT INVENTION

It is an object of the present invention to provide an improved system for applying zinc borate as a composite wood product.

Broadly, the present invention relates to a method of producing a composite wood product comprising forming a sprayable aqueous dispersion of zinc borate particles having a zinc borate content in the range of 20–75% by weight, applying said dispersion on surfaces of wood strands in the amount of between 5 and 25 grams of zinc borate per kg. of wood strands, also applying binder to said wood strands, forming a lay-up of said wood strands with said dispersion of zinc borate applied and said binder applied and then consolidating said lay-up of said wood strands under heat and pressure to form said composite product.

Preferably, said zinc borate is present in said dispersion in the amount of between 30–70% by weight of said dispersion.

Preferably, said dispersion is a wax, zinc borate dispersion containing wax and zinc borate in weight ratios of ¼ to ½.

Preferably, said zinc borate dispersion is mixed with a wax suspension to form said zinc borate dispersion containing wax dispersion.

Preferably, said wax will be present in an amount of 5 parts wax solids to 5 to 10 parts zinc borate.

Preferably, said wax comprises a slack wax.

Preferably, said zinc particles have median particle sizes of 2 to 12 $\mu$m.

Preferably, said zinc borate dispersion will contain an effective amount of thickener, defoamer disperser and surfactant.

Preferably, said thickener will be present in the amount of less than 2% by weight.

Preferably, said thickener will be present in the amount of less than 0.5% by weight.

Preferably, said defoamer will be present in the amount of between 0.5 to 0.1% by weight.

Preferably, said disperser will be present in the amount of less than 5% by weight.

Preferably, said disperser will be present in the amount of less than 1% by weight.

Preferably, said surfactant will be present in the amount of less than 2% by weight.

Preferably, said surfactant will be present in the amount of less than 0.5% by weight.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
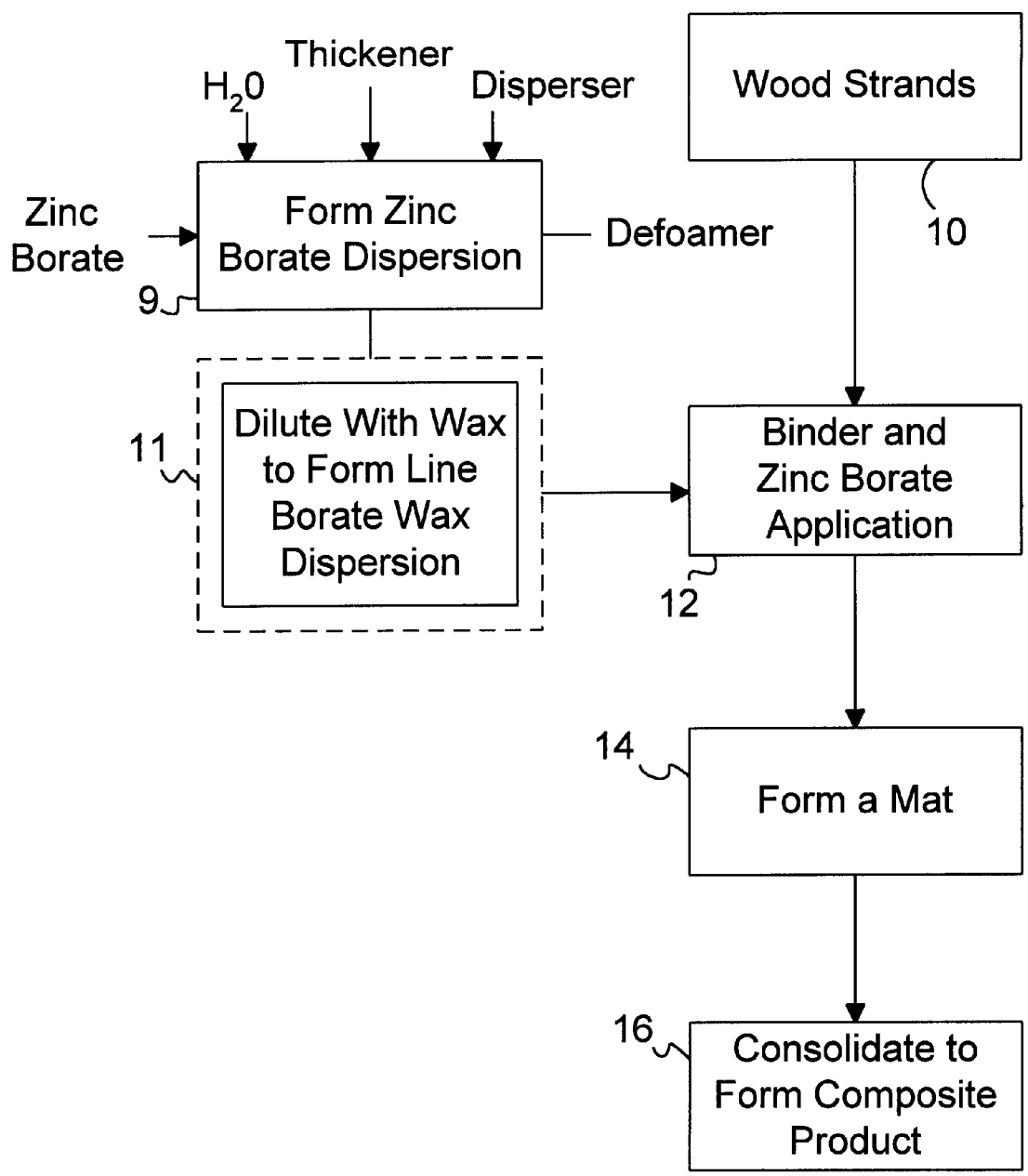
FIG. 1 is a flow diagram of the process of the present invention.

As shown in FIG. 1, wood strands which may be in the form of wafers, strips of wood, particles of wood, etc. as normally used in the manufacture of wood composites, such as strand board, wafer board, oriented strand board, medium density fiber board, or products such as those sold under the trademarks TimberStrand® and Parallam® by Trus Joist MacMillan are delivered to the system as indicated at 10. These strands are then fed in the case of conventional strand or wafer board production to a blending operation indicated at 12 wherein the required amount of binder is applied to the strands and when practising the present invention the strands are coated with the desired amount of a dispersion containing zinc borate (such as those sold under the tradenames Firebrake, Borgard ZB or Composibor sold by US Borax). Sufficient zinc borate is applied to the strands to provide the desired degree of protection to the resultant composite product. The so coated strands are then formed into a mat as indicated at 14 and the mat is consolidated to form the composite wood product as indicated at 16.

In most conventional operations, a wax emulsion is also applied to the strands. With the present invention, the wax preferably forms a significant part of the zinc borate dispersion as will be discussed below.

In the blending operation, generally, the emulsion is applied first particularly with MDI type resins to limit the contact of the resin by water.

Any suitable binder may be applied in 12. Generally, the binders used to produce composite wood products and bind the strands or the like together are phenol formaldehyde (PF) type binders and isocynate (MDI) type resin binders and may also be useful with melamine and urea formaldehyde users. The amounts of such binders applied need not be changed significantly relative to the amounts conventionally used when they are used in combination with the present invention wherein a zinc borate emulsion is also applied to the strands. Thus, the process for making the composite wood product when practicing the present invention is essentially the same in all steps except in place of a powdered zinc borate being applied directly to the wood strands, Applicant forms a sprayable aqueous emulsion of the zinc borate and applies the zinc borate emulsion to the strands prior to consolidation preferable at the same time as the resin component of the composite is applied.

It is also common practice in manufacture of composite wood products to incorporate wax (generally a slack wax) in the product to improve water resistance. Wax is generally added as a separate step or with a binder.

It has been found that the wax may be made part of the zinc borate emulsion and applied to the strands simultaneously with the zinc borate i.e. in the same emulsion. The preferred embodiment incorporates wax in the zinc borate dispersion.

It is important that the zinc borate emulsion be reasonably stable over time at least until applied to the strands (with a reasonable margin of safety) particularly if the process requires premixing or premaking of the aqueous zinc emulsion well before its application in step 12.

The zinc borate emulsions of the present invention include water, thickeners, defoamers or anti-foaming agents, dispersers and surfactants.

The zinc borate dispersion are applied to provide between about 5 and 25 grams of zinc borate for each kilogram of wood.

Generally, thickeners such as suitable cellulose derivatives, water-swellable acrylics, clays, amorphous silica are used as thickeners in the zinc borate emulsion used with the present invention. The cellulose type of thickeners such as hydroxy ethyl cellulose such as that sold by Union Carbide under the trademark Cellosize® or under the trademark Natrosol® by Aqualon are preferred. Generally, these thickeners are present in the emulsions in the amounts of up to 2% based on the weight of the emulsion and preferably less than 0.5% with the amount normally used being about 0.25% based on the weight of the emulsion.

Defoamers or anti-foaming agents are generally present in the range of up to about 1% of the weight of suspension. Preferably, not less than 0.1% with the normal usage being approximately 0.25% based on the weight of the dispersion. Suitable antifoaming agents used in the present invention include, antifoam HL-52 (Harcros Chemicals), BYK031 (BYK Chemie), Foamaster VL (Henkel), Dehydran 1293 (Henkel) and Nopko NXZ (Henkel).

Some polycarboxylic acid salts form dispersers suitable for use with the present invention. Generally, the disperser will be present in amounts up to 5%, preferably less than 1% and will normally be applied in a typical formulation at about 0.5% of the weight of the suspension.

Suitable commercially available dispersers compatible with other materials in the dispersion include Tamol 681 and Tamol 850, both available from Rohm & Haas.

Surfactant or wetting agents suitable for use with the present invention include suitable water soluble ethoxylated fluorol compounds (e.g. zonyl FSM by Dupont Inc.), ethoxylated alkyl phenols and alkylaryl polyethers. The preferred surfactant or wetting agent found todate is a monylphenol ethoxylate sold under the tradename Igepal CO 630 by Stepan.

These wetting agents are generally present in the amounts of up to 2%, preferably less than 0.5% with a typical suspension generally containing about 0.25% by weight of surfactant.

Suitable commercially available wetting agents include Igepal Co630 (Stepan), Polytergent B-300 (Harcros Chemical) and Triton X-100 (Union Carbide).

Applicant has also found that wax may be used as a significant element in the zinc borate dispersion. In most commercial operations wax is applied to the strands during the manufacture of composite wood products. It is a distinct advantage to incorporate the wax into the zinc borate suspension or emulsion as both wax and the zinc borate may be combined into a single stable dispersion, thus be applied in a single step. Suitable wax emulsion include Cascowax EW101 (Borden). When used, the wax will generally be present on a weight ratio of wax to zinc borate of about ⅕ to about ½.

As above indicated, producing wax emulsions and applying them into the strands is well known. However, the making of a high concentration dispersion containing borate was found to be more difficult. When zinc borate is dispersed in pure water, it has a strong tendency to separate (sedimentation) if its concentration is too low—below approximately 65%. A dispersion with a high concentration of zinc borate (above about 75%) increases in viscosity significantly during storage thereby leading to rendering of the dispersion unusable for practical application.

When the two (wax dispersion and zinc borate dispersion) are used separately, the wax dries to form a wax film while the zinc borate returns to powder form. By combining the two into a zinc borate/wax dispersion, the wax precipitates and encapsulates the zinc borate particles and helps to bind the zinc borate particles to the wood strands.

It has been found that the combination of a zinc borate dispersion with a wax emulsion in the proper amounts, produces a surprisingly stable form of zinc borate dispersion.

To produce a zinc borate dispersion which preferably contain wax emulsion one first forms a zinc borate dispersion by mixing under high shear the water, thickener, disperser and deformer and then add further water followed by slow addition of zinc borate as indicated at 9 in FIG. 1. Generally, about half of the water is initially used in premixing and the other half is added at the time the zinc borate is added. Zinc borate is added slowly to reduce the tendency of lumping and thickening. Preferably, a surfactant is added after the zinc borate dispersion has been made.

It is very much preferred to use the zinc borate dispersion in combination with a wax emulsion. Thus, the zinc borate and wax emulsion are mixed to generate the final zinc borate-wax dispersion as indicated at 9 for application to the strands as indicated at 12. The dispersion and emulsion should be mixed slowly and gently to prevent breaking of the wax emulsion.

Generally, the amount of wax emulsion or wax solids basis in the final zinc borate dispersion should be sufficient to stabilize the zinc borate dispersion. This generally requires a significant amount of wax in the order of at least about 50% wax solids based on the zinc borate solids in the dispersion. Obviously, the total amount of wax suspension mixed with the zinc borate dispersion will vary depending on the composition of the actual wax being used. It has been found that a ratio 1 to 2 parts by weight of solid wax to 7 to 10 parts by weight of zinc borax was effective to significantly increase shelf life over the resultant zinc borax dispersion.

Generally, the pH of zinc borate or zinc borate-wax dispersion will not exceed a pH of 8.5. A typical dispersion formulation containing wax is given in Table I.

TABLE I

| Description | % |
|---|---|
| Water | 16.57 |
| Thickener (Natrasol 250 HBR) | 0.25 |
| Disperser (Tamol 681) | 0.5 |
| Anti-foaming Agent (Antifoam HL-52) | 0.025 |
| Water | 12.43 |
| Zinc Borate (Firebrake) | 49.72 |
| Wetting Agent (Polytergent B-300) | 0.25 |
| Water | 4.14 |
| Wax (Casowax EW 403HS) | 16.11 |

To produce the emulsion, zinc borate will have a fine particle size, i.e. a median particle size in the range of about 2 to 12 μm.

The maximum size of the particles is chosen to ensure that a significant number of the particles do not precipitate out of the emulsion and the minimum size is chosen to ensure that the viscosity of the emulsion is not unduly increased. Thus, it is preferred to use a borax having a median size of about 8 μm.

It is important that the concentration of the zinc borate in the dispersion be sufficiently high so that too much water is not added to the composite product as excess water will interfere with the development of proper bonding during consolidation.

The zinc borate dispersion, as above indicated, is preferably stable over time and it does not separate or thicken before application to the wood strands and should be capable of being sprayed, for example, using disk dispersing equipment conventionally used in the industry for application of resin and which has been found to effectively and with sufficient uniformity distribute the suspension over the strands. The zinc borate suspension dispersion is suitable for application by such equipment but it generally is also suitable or may be made suitable for application by other equipment particularly spraying equipment, for example, airless sprayers).

The following summarizes the weight percent for the various components of the dispersion.

TABLE II

| | Weight Percent (100% Basis) | |
|---|---|---|
| | Broad | Preferred |
| Water | 5–80 | 15–45 |
| Hydroxy ethyl Cellulose | 0–2 | 0–0.5 |
| Defoaming Agent | 0–1.0 | 0–0.1 |
| Dispersing Agent | 0–5 | 0–1 |
| Surfactant | 0–2 | 0–0.5 |
| Wax Emulsion (50% solids) | 0–75 | 50 |
| Zinc Borate | 20–75 | 30–70 |
| | 100 | 100 |

The use of dispersions of the present invention is of particular advantage in system wherein the blending stages are operated under negative pressure to prevent loss of materials.

The use of the dispersion of the present invention with MDI type resins wherein the blender is under negative pressure has been found to be particularly effective over operations applying the zinc borate in powder form as it permits reduction of both zinc borate and resin use. It has been found that reductions as high as about 20% may be obtained with the same retention in the final product as when powdered zinc borate is used.

Having described the invention, modifications will be evident to those skilled in the art without departing from the scope of the invention as defined in the appended claims.

We claim:

1. A method of producing a composite wood product comprising forming a sprayable aqueous dispersion of zinc borate particles having a median particle size in the range of 2 to 12 μm and said sprayable aqueous dispersion having a zinc borate content in the range of 20–75% by weight, spraying said dispersion on surfaces of wood strands in the amount of between 5 and 25 grams of zinc borate per kg. of wood strands, also applying binder to said wood strands, forming a lay-up of said wood strands with said dispersion of zinc borate and said binder applied and then consolidating said lay-up of said wood strands under heat and pressure to form said composite product.

2. A method of producing a composite wood product as defined in claim 1 wherein said zinc borate is present in said dispersion in the amount of between 30–70% by weight of said dispersion.

3. A method of producing a composite wood product as defined in claim 1 wherein said dispersion further includes wax.

4. A method of producing a composite wood product as defined in claim 3 wherein said wax comprises a slack wax.

5. A method of producing a composite wood product as defined in claim 2 wherein said dispersion further includes wax.

6. A method of producing a composite wood product as defined in claim 5 wherein said wax comprises a slack wax, to provide a wax to zinc borate weight ratio in said dispersion of between 1/1 and 1/2.

7. A method of producing a composite wood product as defined in claim 1 wherein said zinc borate suspension contains an effective amount of thickener, defoamers disperser and surfactant..

8. A method of producing a composite wood product as defined in claim 7 wherein said thickener is present in the amount of less than 2% by weight.

9. A method of producing a composite wood product as defined in claim 8 wherein said thickener will be present in the amount of less than 1% by weight.

10. A method of producing a composite wood product as defined in claim 7 wherein said defoamer will be present in the amount of between 1 to 0.1% by weight.

11. A method of producing a composite wood product as defined in claim 9 wherein said defoamer will be present in the amount of between 1 to 0.1% by weight.

12. A method of producing a composite wood product as defined in claim 7 wherein said disperser is present in the amount of less than 5% by weight.

13. A method of producing a composite wood product as defined in claim 11 wherein said disperser is present in the amount of less than 1% by weight.

14. A method of producing a composite wood product as defined in claim 7 wherein said surfactant is present in the amount of less than 2% by weight.

15. A method as defined in claim 3 wherein said wax is present in said aqueous dispersion in an amount to provide a wax to zinc borate weight ratio in said dispersion of between 1/1 and 1/2.

16. A method as defined in claim 4 wherein said wax is present in said aqueous dispersion in an amount to provide a wax to zinc borate weight ratio in said dispersion of between 1/1 and 1/2.

17. A method as defined in claim 5 wherein said wax is present in said aqueous dispersion in an amount to provide a wax to zinc borate weight ratio in said dispersion of between 1/1 and 1/2.

18. A method as defined in claim 7 wherein said dispersion further includes wax.

19. A method as defined in claim 18 wherein said wax is present in said aqueous dispersion in an amount to provide a wax to zinc borate weight ratio in said dispers of between 1/1 and 1/2.

20. A method as defined in claim 18 wherein said wax is a slack wax.

* * * * *